United States Patent
Wang (10) Patent No.: US 8,212,924 B2
(45) Date of Patent: Jul. 3, 2012

(54) SYSTEM AND METHOD FOR PROCESSING MULTIMEDIA DATA USING AN AUDIO-VIDEO LINK

(75) Inventor: Tzung-ren Wang, Tainan (TW)

(73) Assignee: Himax Technologies Limited, Sinshih Township, Tainan (TW)

( * ) Notice: Subject to any disclaimer, the term of this patent is extended or adjusted under 35 U.S.C. 154(b) by 581 days.

(21) Appl. No.: 12/464,356

(22) Filed: May 12, 2009

(65) Prior Publication Data

US 2010/0289953 A1    Nov. 18, 2010

(51) Int. Cl.
*H04N 9/475* (2006.01)

(52) U.S. Cl. ... 348/515; 348/500; 348/511; 375/240.16; 375/240.17

(58) Field of Classification Search .......... None
See application file for complete search history.

(56) References Cited

U.S. PATENT DOCUMENTS

| | | | |
|---|---|---|---|
| 7,471,337 B2 * | 12/2008 | Wells et al. | 348/515 |
| 2005/0038661 A1 * | 2/2005 | Momosaki et al. | 704/275 |
| 2005/0134733 A1 * | 6/2005 | Yang | 348/468 |
| 2005/0281289 A1 * | 12/2005 | Huang et al. | 370/484 |
| 2008/0259218 A1 * | 10/2008 | Kondo et al. | 348/700 |
| 2009/0112589 A1 * | 4/2009 | Hiselius et al. | 704/246 |

FOREIGN PATENT DOCUMENTS

| | | |
|---|---|---|
| CN | 1581282 | 2/2005 |
| CN | 1581942 | 2/2005 |

OTHER PUBLICATIONS

Office Action received in Chinese Patent Application No. 201010183384.7 dated Aug. 31, 2011.

* cited by examiner

*Primary Examiner* — Kristine Kincaid
*Assistant Examiner* — Oschta Montoya
(74) *Attorney, Agent, or Firm* — Baker & McKenzie LLP (57) ABSTRACT

A multimedia processor includes an audio processor configured to process an audio input signal to generate an audio output signal and an assistant signal, and a video processor coupled with the audio processor and configured to process video input signal and the assistant signal to generate a video output signal simultaneously according to the video input signal and the assistant signal. Provided with the assistant signal, the video processor acquires more video processing-related information for rendering video content in a more realistic manner. Mal-motion detection can thus be prevented, and video quality can be improved.

19 Claims, 6 Drawing Sheets

SYSTEM AND METHOD FOR PROCESSING MULTIMEDIA DATA USING AN AUDIO-VIDEO LINK

BACKGROUND

1. Technical Field

The embodiments described herein relate to multimedia processing, and more particularly to systems and methods for processing multimedia data using an audio-video link.

2. Description of the Related Art

Multimedia, namely, the combination of text, animated graphics, video, and audio, presents information in a way that is more interesting and easier to grasp than text alone. Multimedia is widely used for education at all levels, job training, and games by the entertainment industry. The development of multimedia technology has brought consumers multimedia presentation systems such as television (TV) viewing systems (e.g., cable TV, digital TV) and computers with monitors.

Various technologies have been proposed to enhance video quality of multimedia presentation systems. However, conventional multimedia presentation systems regard audio data and video data as independent data and thus manipulate them separately through independent video and audio processors. The only relation between the audio data and video data is merely synchronization.

SUMMARY

The present application describes systems and methods that can share information between audio and video processors for providing higher video/audio quality in multimedia processing.

In some embodiments, a multimedia processor is described. The multimedia processor comprises an audio processor configured to process an audio input signal to generate an audio output signal and an assistant signal, and a video processor coupled with the audio processor and configured to process video input signal and the assistant signal for generating a video output signal simultaneously according to the video input signal and the assistant signal.

In other embodiments, a multimedia processing method is disclosed. The method comprises receiving and processing an audio input signal to generate an audio output signal and an assistant signal, and receiving and processing a video input signal and the assistant signal to generate a video output signal simultaneously according to the video input signal and the assistant signal.

These and other features, aspects, and embodiments are described below in the section entitled "Detailed Description."

BRIEF DESCRIPTION OF THE DRAWINGS

Features, aspects, and embodiments are described in conjunction with the attached drawings, in which.

DETAILED DESCRIPTION

Conventional multimedia presentation systems regard audio data and video data as independent data and thus manipulate them separately with a video processor and an audio processor. This is contrary to the real world where we live, which is neither pantomime nor broadcast type. In the real world, beings can close eyes while still able to perceive and predict what is happening around by hearing. The reason is that the sound often carries image content-related information, and thus may also be able to provide cues for predicting image content. Conventional multimedia technologies ignore such valuable cue information provided by audio data and never utilize the audio cue information in the processing of video data for rendering video content with improved realism.

Figure 1:
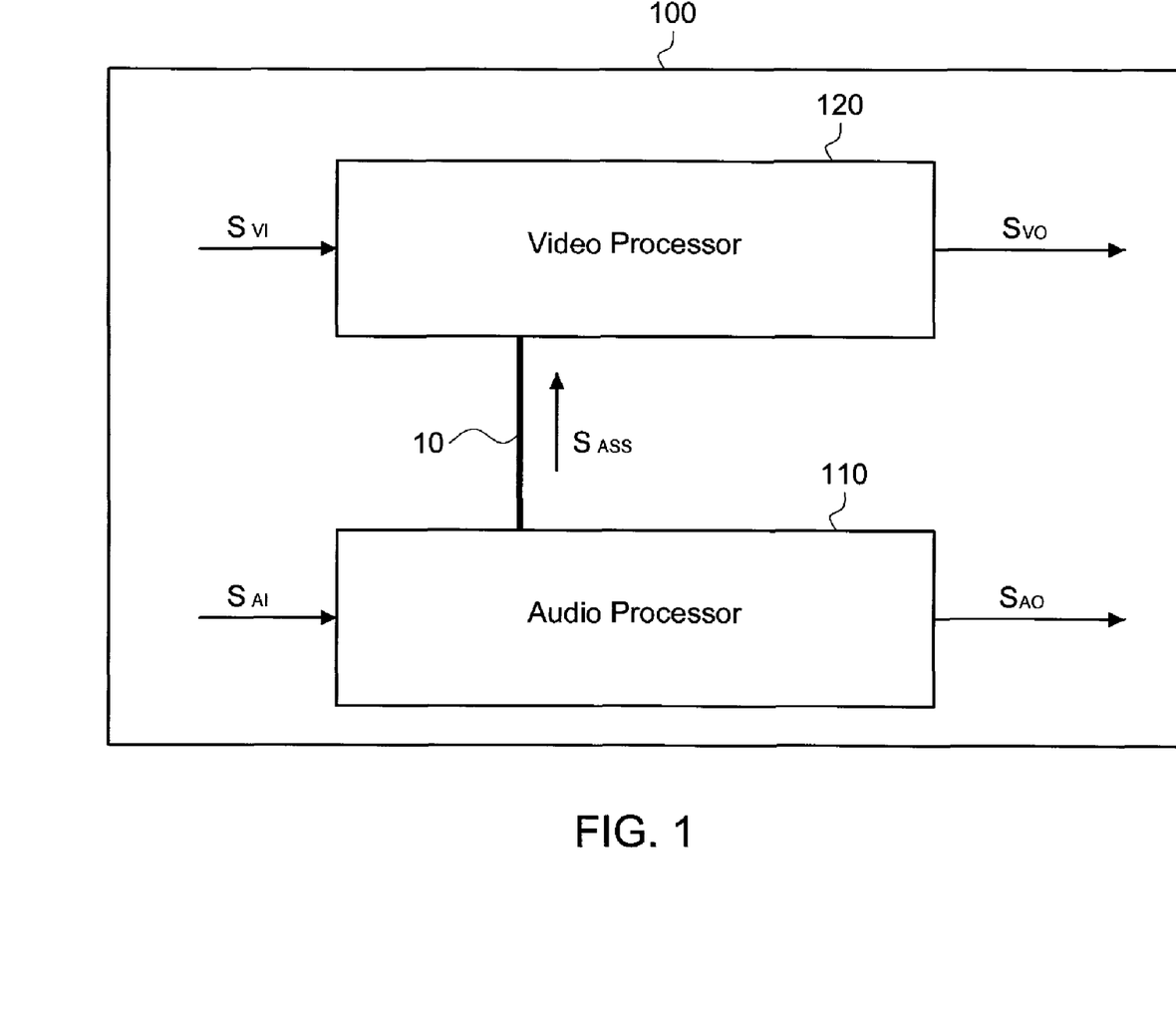
FIG. 1 is a block diagram of a multi-media processor in accordance with one embodiment of the present invention.

FIG. 1 is a block diagram of a multi-media processor 100 in accordance with one embodiment. As shown, the multi-media processor 100 comprises an audio processor 110, a video processor 120, and an audio-video (AV) link 10. The AV link 10 can be any type of data path capable of coupling the audio processor 110 and the video processor 120.

The audio processor 110 is configured to receive an audio input signal $S_{AI}$ and process the audio input signal $S_{AI}$ to generate an audio output signal $S_{AO}$ that may be provided to an output device such as a speaker (not shown) for play. Additionally, the audio processor 110 is also configured to extract audio cue information based on the audio input signal $S_{AI}$, and transmit an assistant signal $S_{ASS}$ carrying the audio cue information to the video processor 120 through the AV link 10.

The audio cue information can include video processing-related information hidden within the audio input signal $S_{AI}$. For example, in some embodiments, the audio input signal $S_{AI}$ and the video input signal $S_{VI}$ may record the sound and the image of a sound generator (e.g. an object), respectively. In this case, there may be image features of the sound generator that can be correlated with the sound features of the sound generator. Any information about such features can be extracted to serve as the audio cue information. In accordance with some specific embodiments, the audio cue information can comprise at least one information type, which for example, can be content type information (such as speech (human voice), music, and etc.), frequency information, amplitude information (i.e. volume information), tempo information, and tone information.

The video processor 120 is coupled with the audio processor 110 via the AV link 10. The video processor 120 is configured to receive and process a video input signal $S_{VI}$ and the assistant signal $S_{ASS}$ to generate a video output signal $S_{VO}$ simultaneously according to the video input signal $S_{VI}$ and the assistant signal $S_{ASS}$. The video processor 120 can then provide the video output signal $S_{VO}$ to a video output device such as a display panel (not shown) for display.

Because the video processor 120 receives the audio cue information shared by the audio processor 110, the video processor 120 can acquire additional video processing-related information carried by the audio input signal $S_{AI}$ in addition to the video content carried by the video input signal $S_{VI}$. The audio cue information provides additional "cues" that may be used by the video processor 120 for rendering video content with increased realism. As a result, higher video quality can be provided in comparison with conventional technologies. It is worth noting that the embodiments described herein can be implemented with a low cost because no extra pins, package, and die cost are required for the coupling between the audio processor 110 and the video processor 120.

Figure 2A:
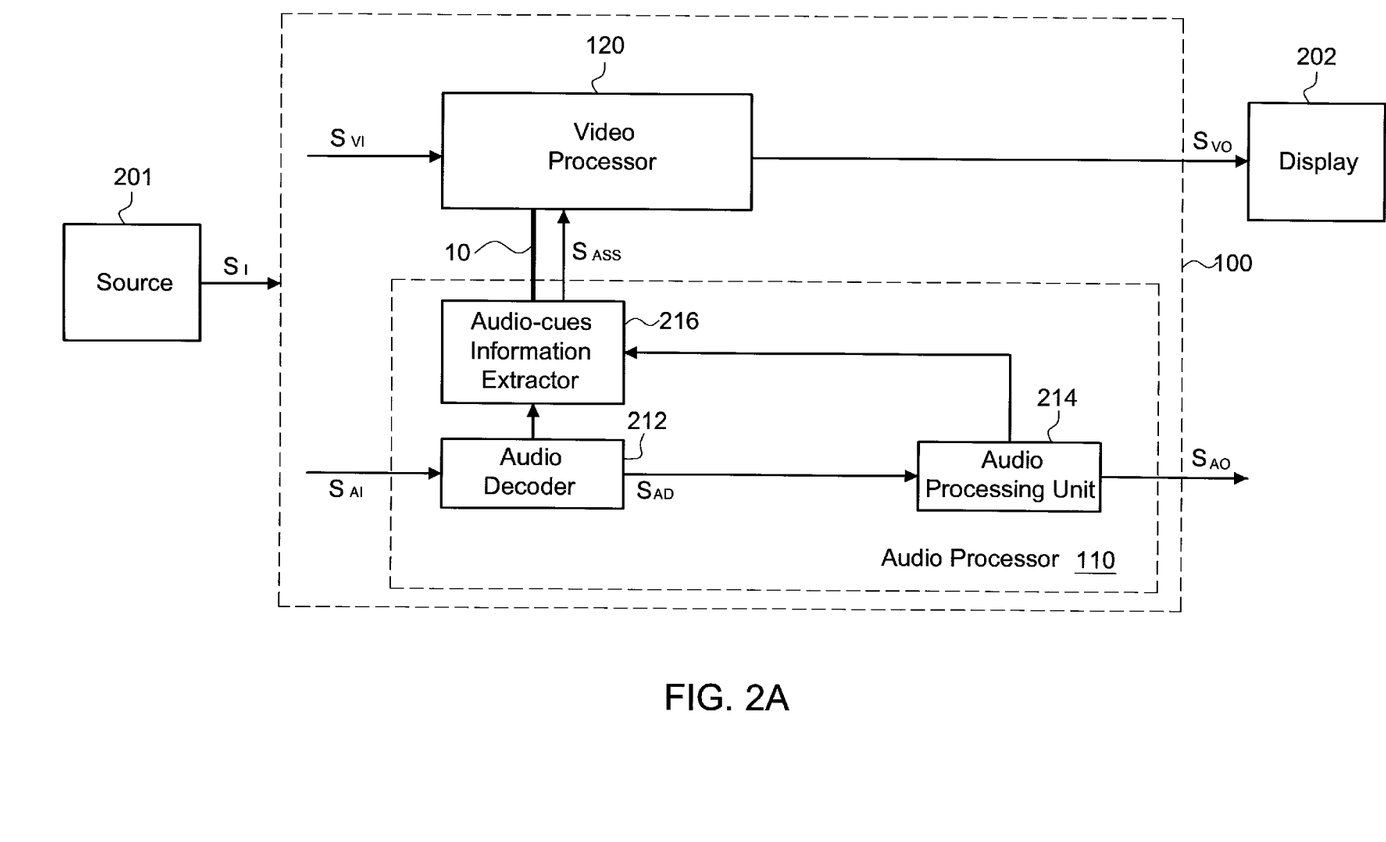
FIGS. 2A and 2B are block diagrams illustrating two variant embodiments of the multi-media processor of FIG. 1.
Figure 2B:
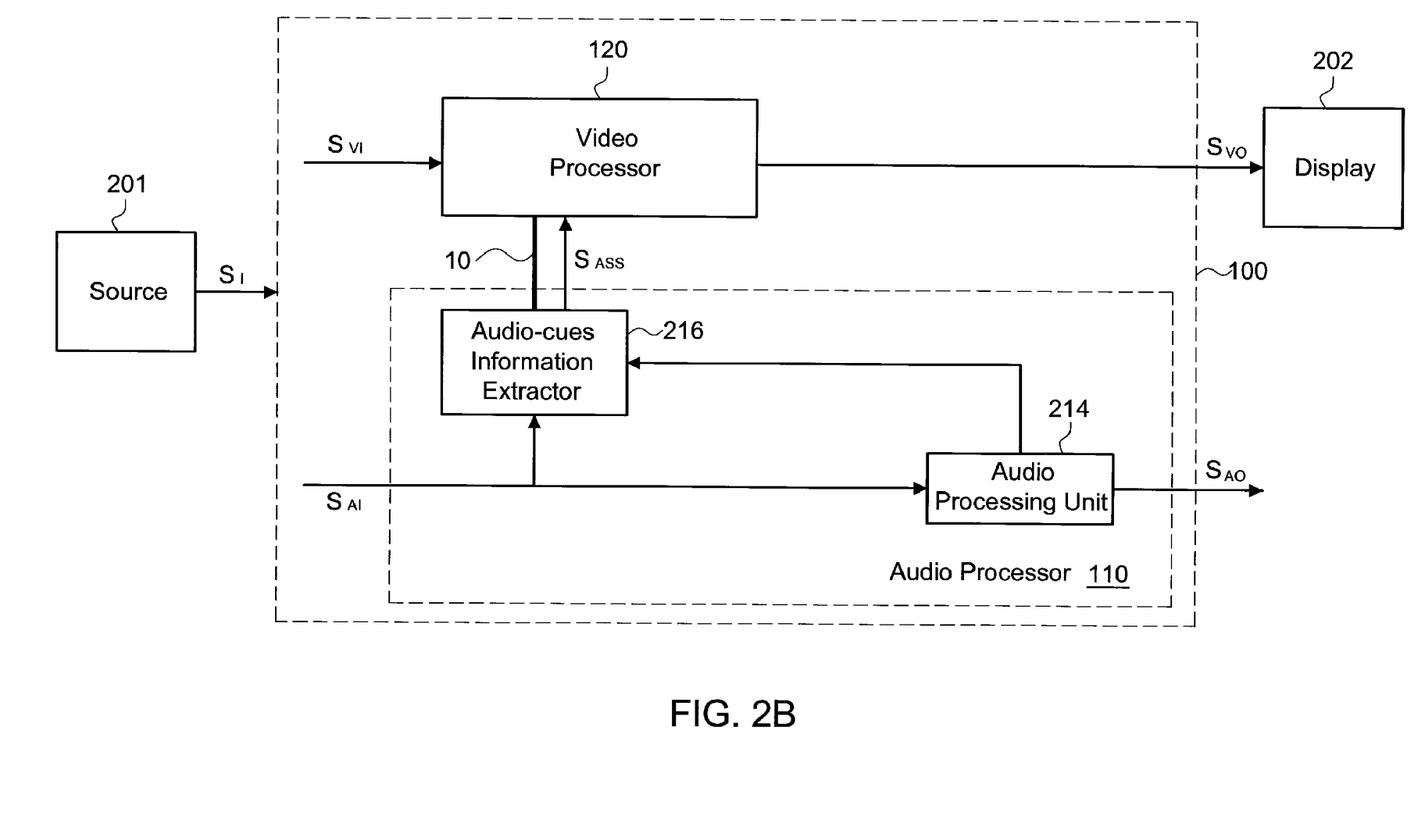

FIGS. 2A and 2B are block diagrams illustrating two possible embodiments of the multi-media processor 100 of FIG. 1. Referring to FIG. 2A, the multi-media processor 100 can be coupled with a source device 201 and a display device 202 (such as an LCD panel). The multi-media processor 100 can be implemented as a single integrated circuit, and can be incorporated in or coupled with the display device 202. The multimedia processor 100 can comprise an audio processor 110 configured to convert an audio input signal $S_{AI}$ to an audio output signal $S_{AO}$, and a video processor 120 configured to convert a video input signal $S_{VI}$ to a video output signal $S_{VO}$.

The multi-media processor 100 receives the input signal $S_I$ from the source device 201, which can be either an analog or digital signal source device. When the source device 201 is an analog source device (for example, an analog television broadcast, analog VCR, DVD player, camcorder, laser disk player, TV tuner, set top box (with satellite DSS or cable signal), and like devices), the input signal $S_I$ can be an analog signal. In this case, an analog-to-digital converter (not shown) may be incorporated in or coupled with the multimedia processor 100 to convert the analog input signal $S_I$ into a digital video input signal $S_{VI}$ and a digital audio input signal $S_{AI}$ suitable for digital processing.

When the source device 201 is a digital source device (for example, a digital television broadcast (DTV), digital video camera, and like devices that use well known digital formats such as, SMPTE 274M-1995, SMPTE 296M-1997, and standard 480 progressive scan video), the input signal $S_I$ can be a digital signal. In this case, a demultiplexer or parser (not shown) may be incorporated in or coupled with the multimedia processor 100 to decompose the digital input signal $S_I$ into a video input signal $S_{VI}$ and an audio input signal $S_{AI}$.

In one embodiment, the audio processor 110 may comprise an audio decoder 212, an audio processing unit 214, and an audio cue information extractor 216. The audio decoder 212 is configured to read the audio input signal $S_{AI}$, specify a coding system, and detect synchronous information in accordance with an audio header within the audio input signal $S_{AI}$ for extracting audio parameters, such as a sampling frequency, the number of channels, etc. The audio decoder 212 can then decode audio packets of the coded audio data by using these audio parameters to obtain a decoded audio signal $S_{AD}$ and transmit the decoded audio signal $S_{AD}$ to the audio processing unit 214.

The audio processing unit 214 is configured to convert the decoded audio signal $S_{AD}$ to an analog audio output signal $S_{AO}$. The audio processing unit 214 can then transmit the audio output signal $S_{AO}$ to an output device such as a speaker (not shown) through an audio amplifier (not shown).

The audio cue information extractor 216 is configured to extract audio cue information, and transmit an assistant signal $S_{ASS}$ that carries the audio cue information to the video processor 120. Because the sampling rate for the audio input signal $S_{AI}$ is much lower than that for the video input signal $S_{VI}$, the audio cue information extractor 216 can easily extract audio cue information from the audio input signal $S_{AI}$.

Unlike the synchronization information that is obtained from the audio header of the coded audio data stream, the audio cue information can be extracted from diverse portions of the audio data stream (e.g., the audio header and the audio data) and can be employed for improving video quality, wherein the extracted information can include control information, timing information, and/or audio data content, for example.

In some embodiments, the audio cue information extractor 216 may obtain the audio cue information from the statuses/flags of the audio decoder 212 that are set when the audio data and/or the statuses/flags of the audio processing unit 214 are decoded during processing of the decoded audio signal $S_{AD}$. In some other embodiments, the audio cue information extractor 216 may also obtain the audio cue information from the acoustic parameters extracted from the audio header. As shown in FIG. 2A, the audio cue information extractor 216 can generate the assistant signal $S_{ASS}$ according to one or more inputted signal, including the audio input signal $S_{AI}$, a signal from the audio decoder 212, and/or a signal from the audio processing unit 214.

As described in the embodiment shown in FIG. 1, the video processor 120 is configured to process the video input signal $S_{VI}$ and the assistant signal $S_{ASS}$ to generate the video output signal $S_{VO}$ simultaneously according to the video input signal $S_{VI}$ and the assistant signal $S_{ASS}$. Because more video processing-related information are acquired for processing, namely, the audio cue information carried by the assistant signal $S_{ASS}$ in addition to the video information carried by the video input signal $S_{VI}$, the video processor 120 can generate video data with higher video quality (i.e. improved realism) compared with conventional technologies.

In accordance with some embodiments, during the processing of the video input signal $S_{VI}$ and the assistant signal $S_{ASS}$, the video processor 120 can decode the input video signal $S_{VI}$. Additionally, the video processor 120 can provide control of the size and positioning of video display on the display device 202. Additionally, the video processor 120 can change display properties on the display device 202, such as brightness, contrast, saturation, tint, color temperature, flesh tone, and sharpness, with reference to the assistant signal $S_{ASS}$.

FIG. 2B is a block diagram showing another embodiment of the multimedia processor, in which the audio input signal $S_{AI}$ is an analog signal. Unlike the embodiment of FIG. 2A, there is no audio decoder 212 in the embodiment of FIG. 2B. The audio processing unit 214 can convert the audio input signal $S_{AI}$ to an analog audio output signal $S_{AO}$, which can then be played via an output device such as a speaker (not shown). Additionally, the audio cue information extractor 216 can extract audio cue information based on the audio input signal $S_{AI}$. As shown in FIG. 2B, the audio cue information extractor 216 can obtain the audio cue information according to one or more inputted signal, including the audio input signal $S_{AI}$ and a signal from the audio processing unit 214. Other features of the embodiment of FIG. 2B are similar to those of the embodiment of FIG. 2A described previously.

Several embodiments are illustrated below to describe how the audio cue information can be used by the image processor 222 to generate the video output signal $S_{VO}$.

First Embodiment

In one embodiment, the audio cue information extracted by the audio cue information extractor 212 may comprise amplitude information, which is preferably amplitude information for a plurality of channels, such as left and right channels. Based on the amplitude information from different channels, the video processor 120 can assess the actual moving direction of an object (i.e. sound generator) according to the variation in the amplitudes from the different channels. For example, when the amplitude of the left channel goes diminuendo while the amplitude of the right channel goes crescendo, it can be inferred that the object is moving from the left to the right, and vice versa. Based on this additional information, the video processor 120 can generate more accurate motion vectors, yielding higher video quality on the display device 202.

Second Embodiment

In another embodiment, the audio cue information extracted by the audio cue information extractor 212 may comprise amplitude information of one channel. Based on the variation in the amplitude of the channel, the video processor 120 can also attempt to determine whether the image content to render includes explosion graphics (e.g. explosion of a firework). Once the video processor 120 detects the audio cue information indicative of the explosion graphics, the video processor 120 may temporarily stop generating motion vectors. Compared with conventional technologies where malmotion detection commonly occurs in processing explosion graphics, the multimedia processor 100 can temporarily stop generating motion vectors when processing explosion graphics. As a result, explosion graphics can be rendered with improved realism. For better prediction of the occurrence of explosion graphics, the audio cue information in accordance with other embodiments can also comprise additional information, such as content type information, frequency information, tempo information, and/or tone information.

Third Embodiment

In yet another embodiment, the audio cue information extracted by the audio cue information extractor 212 can comprise content type information indicative of the occurrence of human voice in the audio input signal $S_{AI}$. Based on this information, the video processor 120 can then assess the occurrence of human characters in the video content to render. For example, when the video processor 120 detects that the assistant signal $S_{ASS}$ carries human-voice type information, the video processor 120 can adjust image parameters to make video rendering more humanlike. In accordance with some embodiments, the adjusted image parameters can comprise flesh tone, which can be adjusted by the video processor 120 to make the resulting image color/tone closer to the color/tone of the rendered human skin. Consequently, the resulting video image can be displayed on the display device 202 with improved realism.

It can be noted that in the embodiments shown in FIGS. 2A and 2B, the AV link 10 is a one-direction channel for transmitting the assistant signal $S_{ASS}$ from the audio processor 110 to the video processor 120. In alternate embodiments, the video processor can also issues another assistant signal $S'_{ASS}$ used by the audio processor for processing audio input signals.

Figure 3:
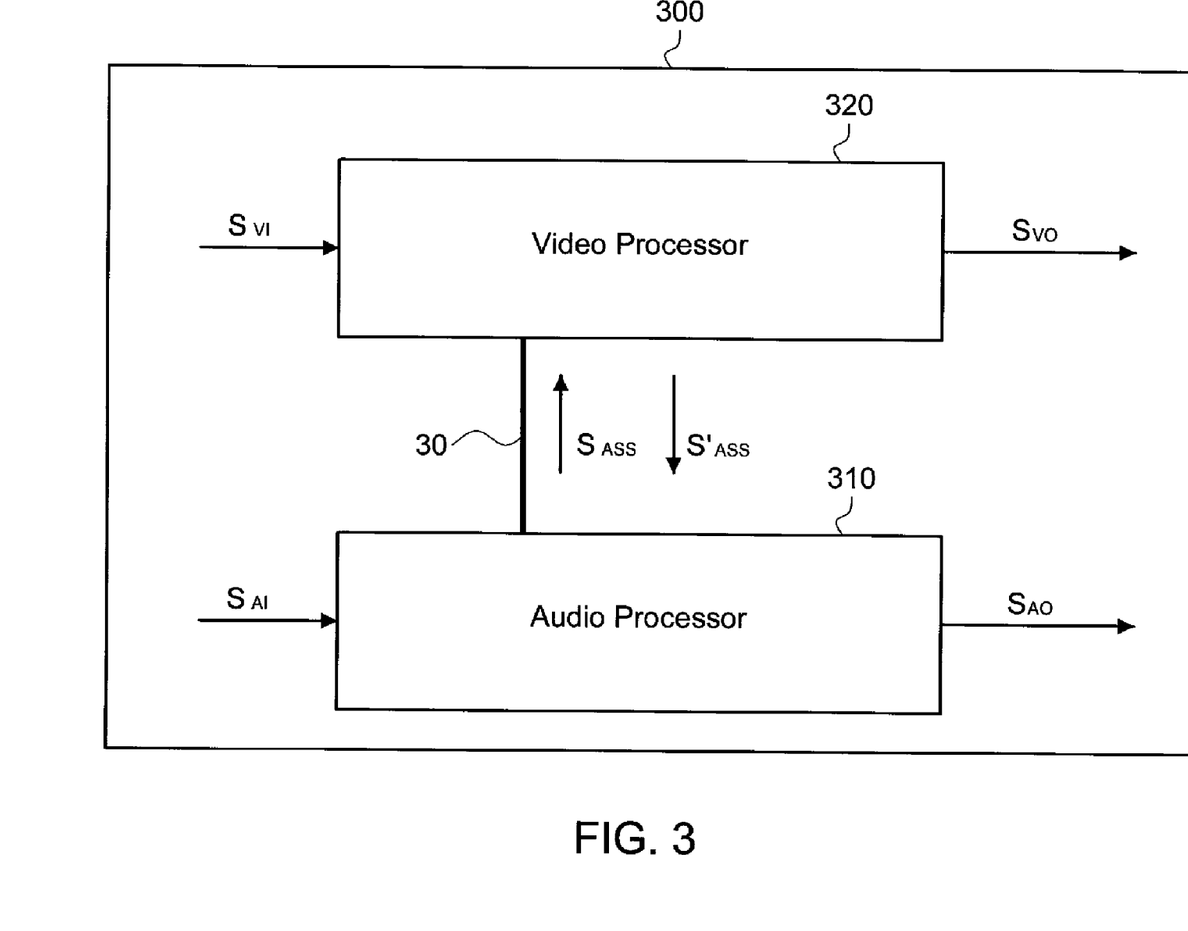
FIG. 3 is a block diagram of a multi-media processor in accordance with another embodiment of the invention.

FIG. 3 is a block diagram of a multi-media processor 300 in accordance with another embodiment, which differs from the multi-media processor 100 in FIG. 1 mainly in that the one-direction AV link 10 is replaced with a bi-directional AV link 30. In FIG. 3, the video processor 320 can extract video cue information based on a video input signal $S_{VI}$, and transmit an assistant signal $S'_{ASS}$ carrying the video cue information through the AV link 30 to the audio processor 310. The video cue information may include audio processing-related information hidden within the video input signal $S_{VI}$. The audio processor 310 is configured to process an audio input signal $S_{AI}$ and the assistant signal $S'_{ASS}$, and generate an audio output signal $S_{AO}$ simultaneously according to the audio input signal $S_{AI}$ and the assistant signal $S'_{ASS}$.

As more audio processing-related information are acquired for processing, namely, the video cue information carried by the assistant signal $S'_{ASS}$ in addition to the audio information carried by the audio input signal $S'_{AI}$, the audio processor 310 can generate and output audio content with higher audio quality (i.e. with improved realism) compared to conventional technologies. Other features are similar to those described previously in connection with the embodiment of FIG. 1.

Figure 4A:
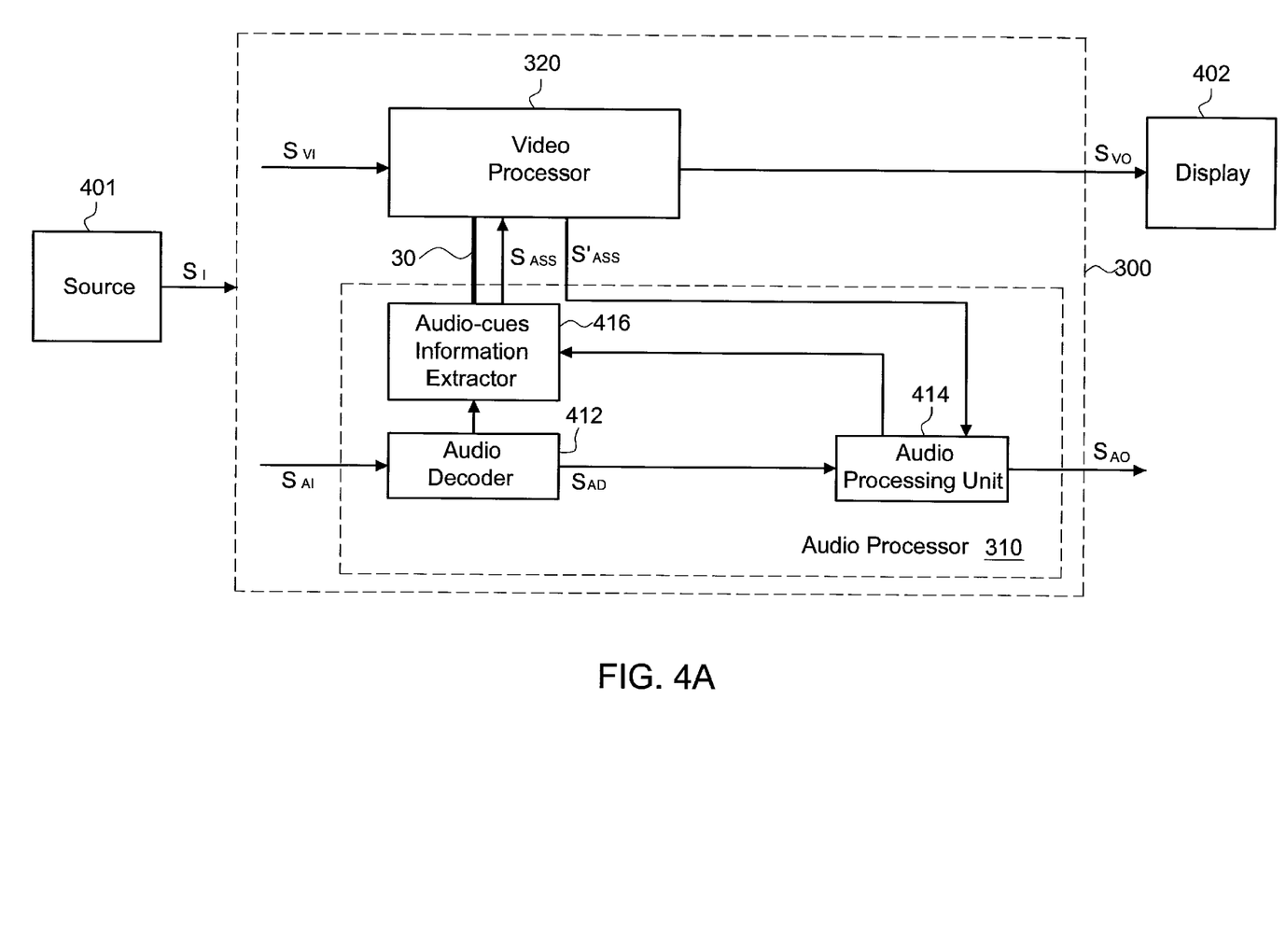
FIGS. 4A and 4B are block diagrams illustrating two variant embodiments of the multi-media processor 300 of FIG. 3.
Figure 4B:
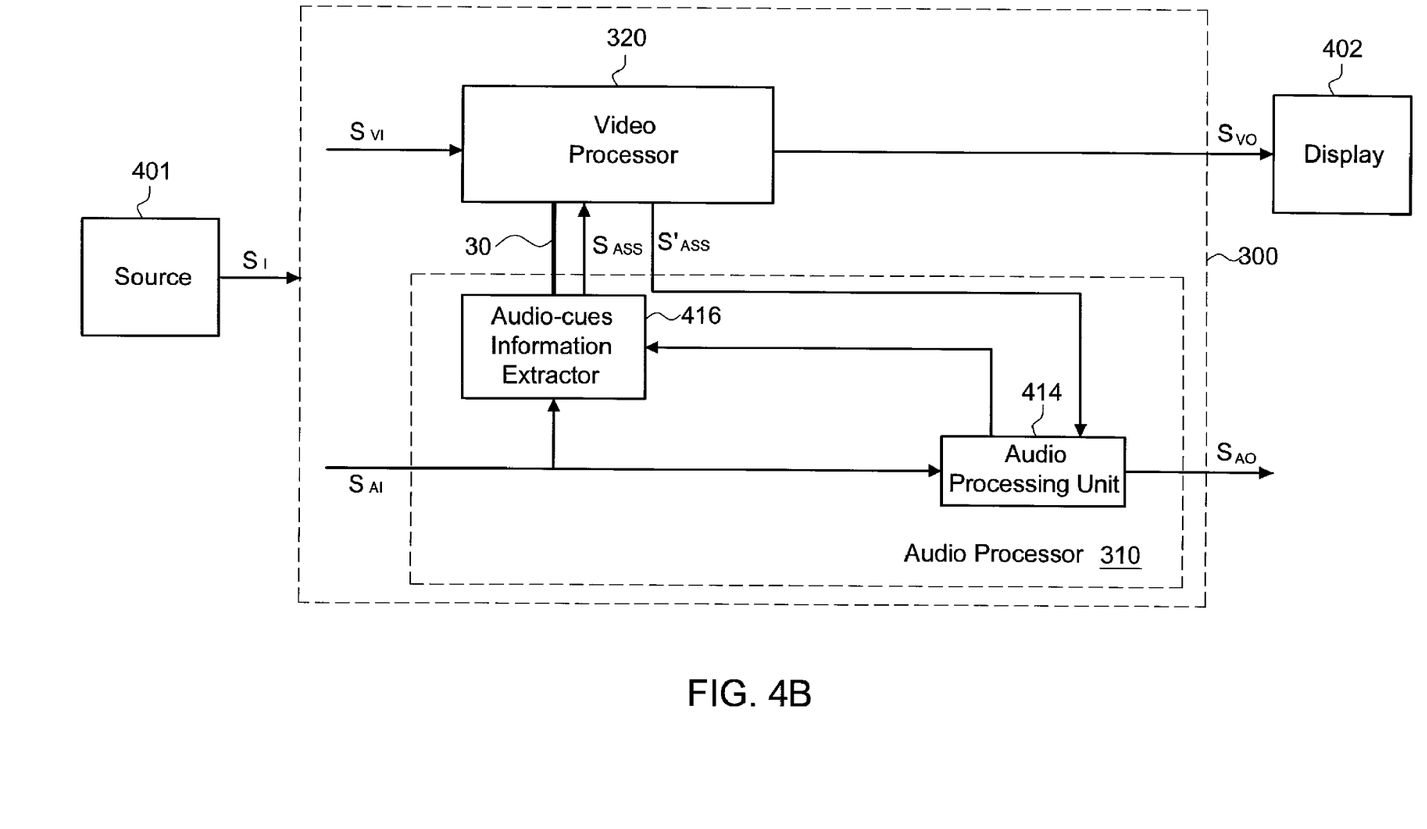

FIGS. 4A and 4B are block diagrams illustrating two possible embodiments of the multi-media processor 300 of FIG. 3. Referring to FIG. 4A, the multi-media processor 300 is coupled with a source device 401 and a display device 402 (such as an LCD panel). The multi-media processor 300 may include an audio processor 310 and a video processor 320 coupled with the audio processor 310 via an AV link 30. The audio processor 310 may comprises an audio decoder 412, an audio processing unit 414, and an audio cue information extractor 416. The audio cue information extractor 416 may be configured to extract audio cue information from the audio input signal $S_{AI}$ decoded by the audio decoder 412 and/or a signal processed by the audio processing unit 414, and then transmits the assistant signal $S_{ASS}$ to the video processor 320 for rendering video content, as described previously. In addition, the video processor 320 can extract video cue information from the video input signal $S_{VI}$, and then transmits the assistant signal $S'_{ASS}$ carrying the video cue information through the AV link 30 to the audio processing unit 414. The audio processing unit 414 can then process the assistant signal $S'_{ASS}$ and a decoded audio signal $S_{DA}$ issued from an audio decoder 412 for generating an analog audio output signal $S_{AO}$. The audio output signal $S_{AO}$ can then be played via an output device such as a speaker (not shown).

FIG. 4B illustrates a variant embodiment without the audio decoder 412 shown in FIG. 4A. The embodiment of FIG. 4B may be implemented for applications where no decoding of the inputted audio signal is required. In this case, the audio cue information extractor 416 may extract audio cue information from the audio input signal $S_{AI}$ and/or a signal processed by the audio processing unit 414, and then accordingly transmits the assistant signal $S_{ASS}$ carrying the cue information to the video processor 320 for rendering video content. In addition, the audio processing unit 414 can process the assistant signal $S'_{ASS}$ provided by the video processor 320 and the audio input signal $S_{AI}$ for generating the analog audio output signal $S_{AO}$. Other features are similar to those described previously in connection with the embodiments of FIGS. 4A, and 2A-2B.

While certain embodiments have been described above, it will be understood that the embodiments described are by way of example only. Accordingly, the apparatus and methods described herein should not be limited based on the described embodiments. Rather, the apparatus and methods described herein should only be limited in light of the claims that follow when taken in conjunction with the above description and accompanying drawings. Therefore, the scope of the appended claims should be accorded the broadest interpretation so as to encompass various modifications and similar arrangements as would be apparent to those skilled in the art.

What is claimed is:

1. A multimedia processor, comprising:
   an audio processor configured to process an audio input signal to generate an audio output signal and an assistant signal; and
   a video processor coupled with the audio processor, wherein the video processor is configured to
      process a video input signal and the assistant signal for generating a video output signal simultaneously according to the video input signal and the assistant signal; and
      temporarily stop generating motion vector information when the received assistant signal indicates the occurrence of explosion graphics.

2. The multimedia processor of claim 1, wherein the assistant signal includes audio cue information extracted based on the audio input signal.

3. The multimedia processor of claim 2, wherein the audio processor extracts the audio cue information based on the information carried by at least one of an audio header and audio packets within the audio input signal.

4. The multimedia processor of claim 1, wherein the audio processor generates the assistant signal according to statuses or flags that are set in processing the audio input signal to generate the audio output signal.

5. The multimedia processor of claim 1, wherein the audio processor comprises:
an audio decoder configured to decode the audio input signal to form a decoded audio signal;
an audio processing unit configured to convert the decoded audio signal to the audio output signal; and
an audio cue information extractor configured to generate the assistant signal by extracting audio cue information within the audio input signal.

6. The multimedia processor of claim 1, wherein the audio processor comprises:
an audio processing unit configured to convert the audio input signal to the audio output signal; and
an audio cue information extractor configured to generate the assistant signal by extracting audio cue information within the audio input signal.

7. The multimedia processor of claim 1, wherein the video processor further generate a second assistant signal, and the audio processor further receives and processes the second assistant signal to generate the audio output signal simultaneously according to the audio output signal and the second assistant signal.

8. The multimedia processor of claim 1, wherein the assistant signal comprises at least one of content type information, frequency information, amplitude information, tempo information, and tone information carried by the audio input signal.

9. The multimedia processor of claim 1, wherein the assistant signal comprises content type information and the video processor is further configured to adjust a flesh tone of the video output signal according to the content type information.

10. The multimedia processor of claim 1, wherein the assistant signal comprises amplitude information for different channels, and the video processor is further configured to generate motion vectors according to the amplitude information for the different channels.

11. A multimedia processing method comprising:
processing an audio input signal;
generating an assistant signal and an audio output signal from the processed audio input signal;
processing a video input signal and the assistant signal; and
generating a video output signal simultaneously according to the video input signal and the assistant signal, wherein the step of generating the video output signal includes temporarily stopping generating motion vector information when the received assistant signal indicates the occurrence of explosion graphics.

12. The multimedia processing method of claim 11, wherein the step of generating the assistant signal comprises extracting audio cue information based on the audio input signal.

13. The multimedia processing method of claim 12, wherein the step of extracting the audio cue information is based on the information carried by at least one of an audio header and audio packets within the audio input signal.

14. The multimedia processing method of claim 11, wherein the assistant signal is generated according to statuses or flags that are set during processing of the audio input signal.

15. The multimedia processing method of claim 11, wherein the step of processing the audio input signal comprises:
decoding the audio input signal to form a decoded audio signal;
converting the decoded audio signal to the audio output signal; and
extracting audio cue information from the audio input signal.

16. The multimedia processing method of claim 11, wherein the step of processing the audio input signal comprises:
converting the audio input signal to the audio output signal; and
extracting audio cue information from the audio input signal.

17. The multimedia processing method of claim 11, further comprising generating a second assistant signal, and wherein the step of generating the audio output signal is performed simultaneously according to the audio output signal and the second assistant signal.

18. The multimedia processing method of claim 11, wherein the assistant signal comprises at least one of content type information, frequency information, amplitude information, tempo information, and tone information carried by the audio input signal.

19. The multimedia processing method of claim 11, wherein the assistant signal comprises content type information and generation of the video output signal further comprises adjusting flesh tone of the video output signal according to the content type information.

* * * * *